United States Patent
Weinmann

(10) Patent No.: US 9,851,036 B2
(45) Date of Patent: Dec. 26, 2017

(54) FLUID TRANSFER COUPLING

(71) Applicant: Manfred Weinmann, Syrgenstein (DE)

(72) Inventor: Manfred Weinmann, Syrgenstein (DE)

(73) Assignee: CHRISTIAN MAIER GMBH & CO. KG MASCHINENFABRIK, Heidenheim (DE)

(*) Notice: Subject to any disclaimer, the term of this patent is extended or adjusted under 35 U.S.C. 154(b) by 558 days.

(21) Appl. No.: 14/300,299

(22) Filed: Jun. 10, 2014

(65) Prior Publication Data

US 2015/0123395 A1    May 7, 2015

(30) Foreign Application Priority Data

Jun. 11, 2013   (DE) .................. 10 2013 009 759

(51) Int. Cl.
*F16L 27/08* (2006.01)
*F16L 27/12* (2006.01)
*B23Q 11/10* (2006.01)

(52) U.S. Cl.
CPC ......... *F16L 27/0812* (2013.01); *F16L 27/125* (2013.01); *B23Q 11/103* (2013.01)

(58) Field of Classification Search
CPC . F16L 27/0812; F16L 27/082; F16L 27/0849; F16L 27/087; F16L 27/125; B23Q 11/103
See application file for complete search history.

(56) References Cited

U.S. PATENT DOCUMENTS 7,399,001 B2    7/2008   Maier

FOREIGN PATENT DOCUMENTS

| JP | 3675535 | B2 * | 7/2005 | ........... B23Q 11/103 |
| JP | 2008064274 | | 3/2008 | |
| JP | 2008261405 | | 10/2008 | |
| JP | 4228411 | B2 * | 2/2009 | ........... F16L 27/082 |
| JP | 2010101361 | | 5/2010 | |
| JP | 4542114 | B2 * | 9/2010 | ........... F16L 27/082 |

\* cited by examiner

*Primary Examiner* — James M Hewitt, II
(74) *Attorney, Agent, or Firm* — Andrew Wilford

(57) ABSTRACT

A coupling for conveying a fluid between a stationary part and a rotatable part having confronting ports centered on a rotation axis of the rotatable part has an axially extending tube fixed in the port of one of the parts and extending toward the port of the other of the parts and a control element axially slidable on the tube. The one part, the tube, and the control element form an annular chamber around the tube pressurizable for axially shifting the control element. A first slide ring is connected to the control element and carries a seal ring turned toward the port of the other part, and a second ring on the other part at the port thereof axially bears on the first slide ring so that pressurization of chamber presses the slide rings axially against each other.

6 Claims, 3 Drawing Sheets

FLUID TRANSFER COUPLING

FIELD OF THE INVENTION

The present invention relates to a fluid-transfer coupling. More particularly this invention concerns such a coupling used for conveying a fluid between a stationary part and a rotatable part having confronting ports centered on a rotation axis of the rotatable part.

BACKGROUND OF THE INVENTION

A coupling for conveying fluid under pressure and elevated temperatures typically has at least one slide-ring seal through which the medium passes between the stationary and the rotating parts and formed of a slide ring and a counter ring sealing against the slide ring.

Slide-ring seals consist of two parts sliding on each other, namely the slide ring and the counter ring. The counter ring is seated in a sealed and axially rigidly connected manner in one of the parts, while the slide ring is installed in an axially freely movable manner and secured against rotation in the other part. The sealing of the slide and counter rings in relation to the adjacent parts is achieved by so-called secondary seals—preferably designed as O-rings.

To move the slide ring axially, the sealing friction force of the secondary seals must be overcome. For the seal to remain closed also in an unpressurized state, springs normally press the slide ring and counter ring together. For simplicity's sake, the spring contact force will not be taken into account in the following. When the seal is traversed by the fluid medium, it penetrates into the seal gap due to the pressure.

The pressure in the seal gap is decreased from the pressurized side, normally in the nonrotating part, toward the downstream low-pressure side, normally in the rotating part. Due to this pressure decrease within or along the sealing surface, there results a force opening the seal gap and separating the seal surfaces. To prevent the gap from opening, a hydraulic load ring bears on the slide ring acts to force closing of the seal gap. The ratio of the gap-closing force part to the gap-opening force part is referred to as load ratio "K." Material-specific properties of the seal materials and the K value are decisively responsible for the sealing properties and service life of a slide-ring seal.

If a slide-ring seal is operated with a certain medium and permanent operating conditions, such as pressure, temperature and number of revolutions, the K value is configured to the applications correspondingly. For low pressures and low revolutions, load ratios greater than 1 are often used; here, one refers to unbiased slide-ring seals. At higher pressures and increasing RPM, one usually uses biased slide-ring seals with a ratio <1 (conventionally 0.65 to 0.85). A biased slide-ring seal increases the fluid content in the seal gap, thereby better cooling and lubricating the mutually rubbing sealing surfaces, and thus ensuring a correspondingly longer service life of the seal.

If slide-ring seals are used for widely varying fluids and pressures, it is difficult to achieve an optimal configuration for all applications. Such an application of different fluids is found for example when machining on machine tools. There, cooling lubricants are transported directly to the blade through the rotating spindle and the tool installed there. Conducting the medium to the rotating spindle shaft is performed by rotary feedthroughs or seal kits. In these parts, contacting slide-ring seals are used primarily. For cooling the blade, cooling lubricants, multifunction oils, dry compressed air and oil-air aerosols are used depending on the machining step. However, machining without any fluid is also not unknown.

The biggest problem generally occurs when machining with compressed air, in other words without a cooling and lubricating medium, since here there is no lubricant in the seal gap. As a result, the seal becomes hot, wears relatively quickly, and often fails completely due to overheating. To counteract this occurrence, there are various solutions on the market.

In one solution known from actual practice, one alternates between controlled leakage and closed seal surfaces, depending on the pressure and type of medium. However, this has the disadvantage that when supplying the fluid, high leakage rates and undesired energy losses occur when the seal surfaces are open. In addition, dirt particles can enter between the separated sealing surfaces and damage their lapped surfaces when the seals make sliding contact at a later point.

A solution is known from patent EP 1 567 798 [U.S. Pat. No. 7,390,001], in which a thermally controlled coupling creates a force-fitting connection of a sealing ring to an expansion element. When the expansion elements heats up, the change in length is transferred via a coupling to thereby reduce the contact force of the sealing rings, without opening the seal.

In the solution known from JP-A-2010-101361, the seal surfaces are not directly passed through (in the passage between the seal, a tube is installed through which the medium flows), and a load ratio for the slide-ring seal equal to or less than 0.6 is selected. Supposedly, a controlled leak then adjusts itself.

An idea was proposed in JP-A-2008-261405, according to which, for two fluids, different load ratios are achieved at the seal. A smaller K value is hereby provided for compressed air, and a larger K value is provided for a lubricating medium. This is achieved by the displacement of a piston with a hole, so that various ring surfaces are opened or closed. The control piston is moved via an external pressure connection.

A similar solution is proposed in JP-A-2008-64274. For the ring surface to be unbiased for the closing force, a biasing ring surface is also created that is sealed off from the flowing medium and the atmosphere by secondary seals. An external control pressure can reduce the preset compression caused by the structural in the sealing surface correspondingly depending on various fluid and operational modes.

OBJECTS OF THE INVENTION

It is therefore an object of the present invention to provide an improved fluid-transfer coupling.

Another object is the provision of such an improved fluid-transfer coupling that overcomes the above-given disadvantages, in particular that is able to change the load ratio, described above, of a slide-ring seal in an infinitely variable manner to the operating conditions.

SUMMARY OF THE INVENTION

A coupling for conveying a fluid between a stationary part and a rotatable part having confronting ports centered on a rotation axis of the rotatable part has according to the invention an axially extending tube fixed in the port of one of the parts and extending toward the port of the other of the parts and a control element axially slidable on the tube. The one part, the tube, and the control element form an annular chamber around the tube pressurizable for axially shifting the control element. A first slide ring is connected to the control element and carries a seal ring turned toward the port of the other part, and a second ring on the other part at the port thereof axially bears on the first slide ring so that pressurization of chamber presses the slide rings axially against each other.

Thus an axially displaceable control element is provided that, depending on the ambient and operating conditions or parameters of the coupling, adjusts the axial position of the slide ring and/or the counter ring and thus the contact pressure acting between the two, the control element being movable on a tube through which the medium passes.

The advance achieved by the invention consists initially in that longer service lives of the slide-ring seal can hereby be achieved under diverse operating conditions. In addition, unnecessary leaks and the resulting energy losses are avoided, which results in a substantially improved environmental life cycle assessment. The seal surfaces remain closed in all operating conditions, so the risk of abrasive particles getting between the seal surfaces and possibly damaging the lapped surfaces is decreased. Such a slide-ring seal can be exposed to various fluids without the initially described disadvantages occurring.

These advantages are achieved by the hydraulic force responsible for closing the seal gap no longer being generated directly by the medium pressure to be sealed off, but via an externally provided, controllable counter-pressure. The medium pressure only applies the force opening the seal gap of the slide-ring seal. The force closing the seal gap of the slide ring is only adjusted externally via a controller according to the ambient and operating conditions.

Alternatively, one can also conceive of a combination of the solution described here with an adjustable contact pressure between the slide and counter ring by a conventional axial slide-ring seal, in which the force closing the seal gap is rigidly dependent on the fluid pressure to be sealed.

In both cases, the preferred embodiment of the invention consists of the tube being sealed relative to the surrounding part on the one hand, and the control element on the other. A good decoupling of the fluid pressure is hereby achieved.

In a preferred embodiment of the invention, the tube is sealed from the part surrounding it on the one hand and the control element on the other. A good decoupling of the fluid pressure is hereby achieved.

In addition, according to the invention the control element has an control sleeve to which the slide ring or the counter ring is firmly attached on the end face.

It is hereby a further advantage if the control sleeve with its end face facing away from the slide ring or counter ring projects into an annular chamber, preferably arranged in the stationary part, and the annular chamber can be filled with a pressurized medium to control the control sleeve via a supply line.

To achieve an optimal adaptation to the operating conditions, it is recommended that, for the control element to control the contact pressure, a temperature sensor is provided near the slide ring and/or counter ring to detect the seal temperature. If the temperature at the seal has a value that could damage the sealing surfaces, the contact pressure is reduced and the wear on the friction surfaces decreases. Simultaneously, the thermal load of all adjacent parts, such as bearings, is reduced.

Accordingly, it is also advantageous for when the control element controls the contact pressure that a leakage sensor is provided. This sensor can be installed in the vicinity of the seal gap or at the connection to the leakage disposal and it detects the leakage occurring at any given time. The gap load is then controlled in combination with the slide ring temperature and the occurring leakage; however, it can also take place without taking the leakage into account.

In addition, it has also proven itself advantageous if a spring element is provided to ensure a basic biasing of the control element, the spring element also being effective when the actual pressure medium is not yet in effect. The use of a spring to generate a basic contact pressure can occur optionally; similarly, a counter pressure on the ring surface can take over the function of the spring.

In this way, problems at the seal can be detected directly and correspondingly corrected by suitable procedures. The detected operating states of the seal can be forwarded to the machine controller, and the operating temperature at the sealing surfaces is primarily part of the essential operating conditions of the seal.

Lastly, two alternative possibilities have proven themselves to be appropriate, according to which the pressure medium for controlling the control sleeve is provided from an independent pressure source or is branched off from the medium flowing through the coupling.

As an energy supply for the load pressure, one can use an existing control hydraulics system or then again one can use the actual fluid pressure in the feedthrough. The control pressure is adjusted via a proportional pressure adjustment valve. In doing so, one can conceive of various sample circuits for various fluid.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
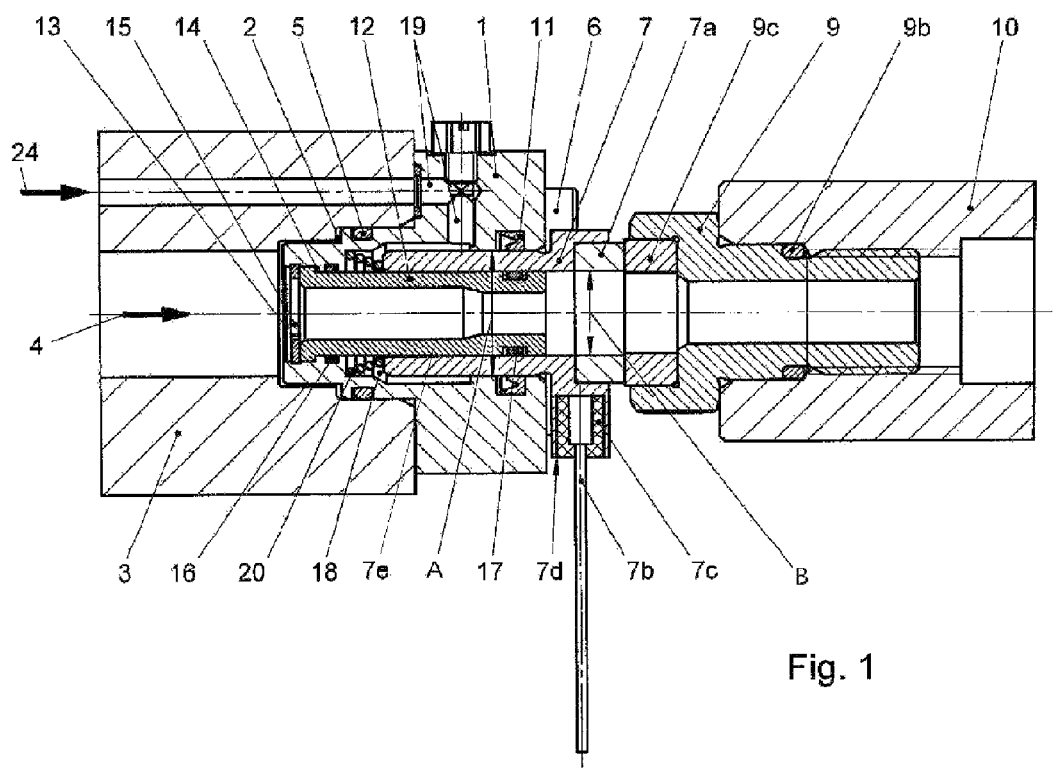
FIG. 1 is an axial section through the coupling according to the invention for installation in a machine tool.

As seen in FIG. 1, a fluid-transfer coupling serves to convey fluid between a stationary part 3 and a rotating part 10. This can be in particular a coupling for conveying fluid under pressure and elevated temperatures to supply a gaseous or liquid cooling and/or lubricating medium 4 from the stationary part 3 to a rotating spindle forming the rotating part 10.

To do so, at least one slide-ring seal is provided that is formed of a nonrotating slide ring 7 and a rotating counter ring 9 sealing it and between the respective stationary and rotating parts 3 and 10. An axially effective control element is provided that, depending on ambient and operating conditions or parameters of the coupling, adjusts the axial position of the slide ring 7 and/or counter ring 9, and thus the axial contact pressure acting between them. The control element is thereby arranged on a tube 12 through which the medium passes.

Figure 3:
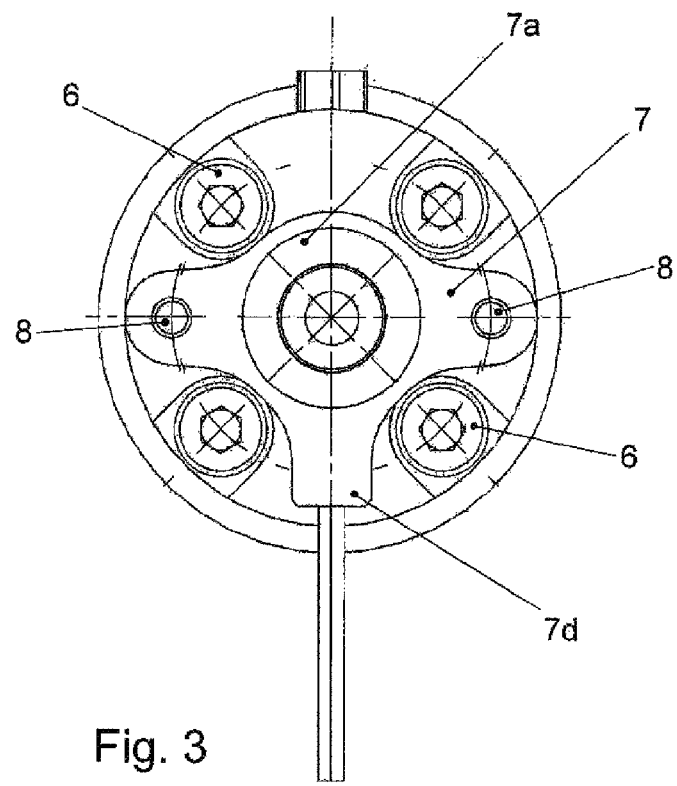
FIG. 3 is an end view of the slide ring of the coupling.

In detail, a housing 1 of the coupling is centered in a seat 2 of the machine tool spindle/stationary part 3 and secured therein by screws 6 as also shown in FIG. 3. A cooling and lubricating medium is supplied via a conduit 4 to an inlet port of the part 3. The sealing of the part 3 and housing 1 to each other is achieved by a seal 5 integrated in the coupling.

The axially moveable slide ring 7 has a hole for fluid throughflow. The slide ring 7 projects axially outward and surrounds an axial seal ring 7a (an end view of the slide ring 7 is shown in FIG. 3). The seal ring 7a can be made of various suitable sealing materials, such as silicone, carbon, or coated materials, and is either shrunken or adhered into the slide ring 7.

Figure 2:
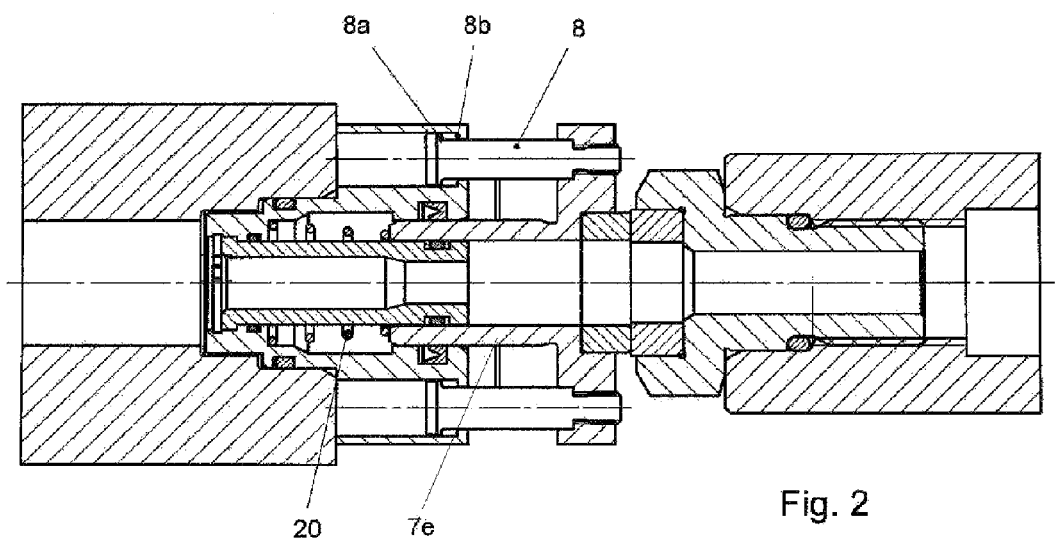
FIG. 2 is an axial section through the coupling of FIG. 1 for a detached tool.

As shown in FIG. 2, two studs 8 screwed into the slide ring 7 engage with play in respective cylindrical guides 8b and angularly lock the ring 7 to the housing 1 fixed in the housing 3. A collar 8a of each stud 8 limits the axial travel of the respective stud 8 in the respective guide 8b. It serves to prevent the slide ring 7 from disengaging, so that it cannot move in an uncontrolled manner out of the guides 8b and seals. The slide ring 7 has in the region of the seal ring 7a a radially open hole 7d (see also FIGS. 1 and 3). A temperature sensor 7b in it is set in a heat-conducting cast-resin body 7c. The slide ring 7 bears axially on another seal ring 9c set in the counter ring 9. Here, the counter ring 9 is screwed into the rotating motor spindle 10 and is coaxial with the slide ring housing 1.

The counter ring 9 is adjacent to the slide ring 7. It has an axially centered passage for the medium to pass through. A seal 9b prevents the lubricant from leaking out between the spindle 10 and the counter ring 9. The actual seal surface is formed by the tightly embedded seal ring 9c that bears with its end face in surface contact with the seal ring 7a.

The center of the slide ring 7 is extended by a cylindrical sleeve 7e extending through a passage 13 of the slide ring housing 1 in the flow direction and sealed by a gland seal 11 relative to the housing 1. This sleeve 7e fits around and slides on the tube 12 that is axially fixed, here by a collar 14 and a retaining ring 15, in the housing 1.

Sealing between the tube 12 and the housing 1 is effected a ring seal 16, and between the tube 12 and the sleeve 7e by another ring seal 17. By this structural measure, a sealed, annular chamber 18 is created. In it is formed the hydraulically acting piston face of the sleeve 7e of the slide ring 7, closing the seal gap, and specifically via diameters A and B according to FIG. 1, without any influence resulting from the actual medium pressure 4. This pressure chamber 18 is connected via radial and axial holes 19 to a control conduit 24 of the arrangement. Alternatively, there is also the possibility of creating the connection to the control conduit 24 via a radial system connection on the housing 1.

Figure 4:
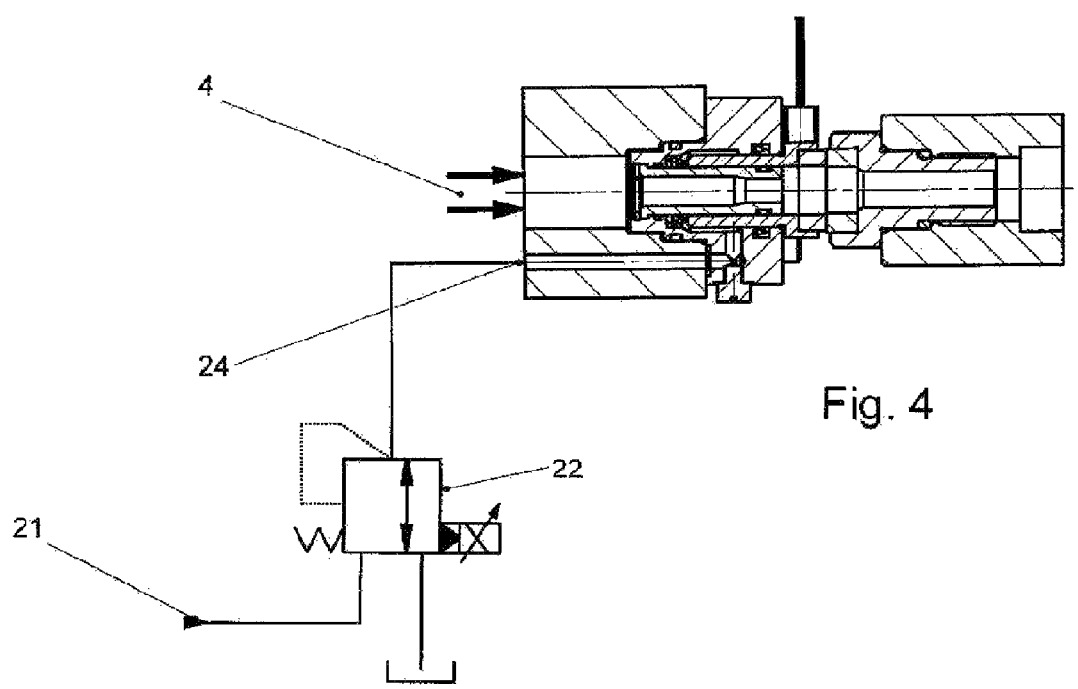
FIG. 4 shows the invention as in FIG. 1 with a schematically shown arrangement for actuation.

This control line 24 can be fed from various sources:

In the embodiment according to FIG. 4, a pressure line 21 of the existing hydraulic system of a machine tool is connected via a proportional pressure adjustment valve 22 to the conduit 24 of the coupling. Normally, the control pressure corresponds to the pressure of the cooling medium, thus at 80 bar of lubricant pressure, the controller sets 80 bar of control pressure at the proportional valve 22. If the temperature at the sealing surface of slide ring 7 exceeds a specified value, e.g. because the cooling and lubricating effect of the medium used in the seal gap is no longer sufficient, the pressure is reduced in steps. The contact pressure of the slide ring 7 is reduced, more lubricant can enter into the seal gap, and the temperature drops. The load and wear on the slide-ring seal decrease.

For seal kits that are equipped with a quantitative leakage detection means (which can be integrated in the hose line or in housing 1), the actual value of the leakage can also be used to establish the contact pressure. If the leakage is excessive, the closing pressure is corrected upward. The slide ring temperature can also be used as a correction value. If the slide ring temperature is too low, the contact force is increased, depending on the type and pressure of the medium, like when the leakage is too high. The slide-ring seal is controlled either directly in the machine controller or by an external control unit. Since the design details of the electronic controller are not part of this invention, they will not be described extensively.

Figure 5:
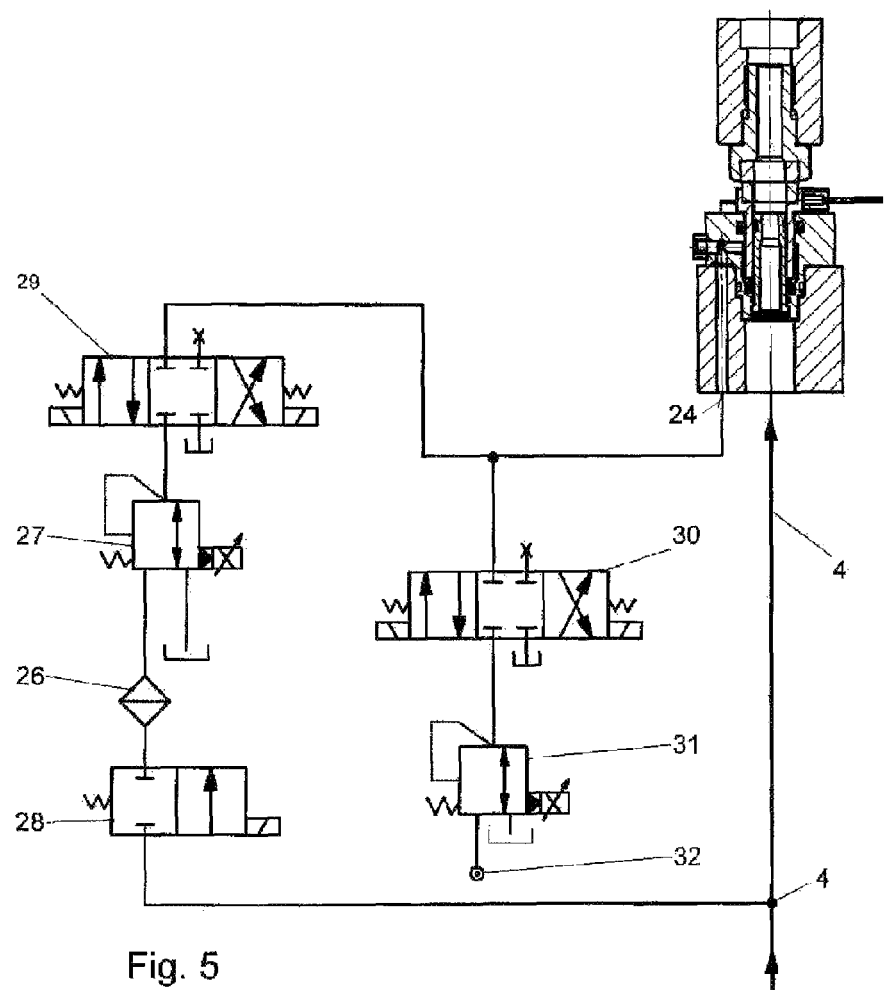
FIG. 5 shows an alternative embodiment to FIG. 4.

The embodiment according to FIG. 5 assumes that no external hydraulic supply is available for controlling the contact pressure. Then, the cooling medium 4 to be delivered is used for supply purposes. To do so, liquid cooling lubricants are passed through a filter 26 via a proportional pressure adjustment valve 27 to the control line. The electronic control function functions as in the example described above with an external hydraulic fluid supply. The control oil pressure is delivered, separated or decreased via directional valves 28 and 29.

For compressed air or gaseous fluid, a directional valve 30 directs this energy source 32 as a control fluid via a pressure regulating valve 31 to the conduit 24.

FIG. 2 shows the state of the tool change coupling for a detached tool. In doing so, the counter ring 9 moves in an axial direction so that the collet chuck can be loosened and the tool holder can be removed. To prevent dirt particles from entering between the seal surfaces, the seal rings 7a and 9c should always remain in surface contact.

In the invention, this can take place by two different couplings:

A conical spiral spring 20 (shown in FIGS. 1 and 2) is installed in the annular chamber 18. This spring 20 permanently presses the slide ring against the counter ring. This solution is currently used in conventional slide-ring seals. However, it shall be noted that the contact force changes with the spring travel.

Instead of the spring, this invention allows one to supply a certain air pressure to the annular chamber 18 via the control line. This has the advantage that the pressure then corresponds to a constant contact force.

Figure 6:
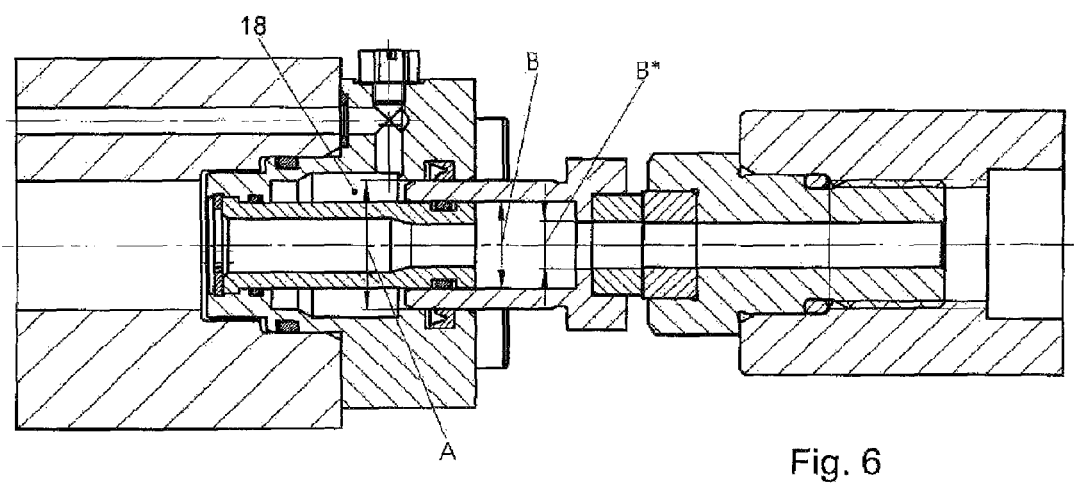
FIG. 6 shows a conventional axial slide-ring seal combined with the solution according to the invention with adjustable contact pressure between the slide and counter rings in the system of FIG. 2.

A possible variant of the new solutions shown in FIGS. 1 and 2 is illustrated in FIG. 6. In addition to the already described possibility for generating a variable contact force between the slide and counter rings, there results an additional partial load resulting from the fluid pressure to be sealed off, similar to a conventional axial slide-ring seal. As emerges from FIG. 6, this is structurally realized in that diameter B at seal ring 7a and slide ring 7 is no longer identical, but have various diameters B or B*.

I claim:

1. A coupling for conveying a fluid from a source and thence between a stationary part and a rotatable part having confronting ports centered on a rotation axis of the rotatable part, the coupling comprising:
   an axially extending tube fixed in the port of the stationary part and extending toward the port of the rotatable part;
   a control sleeve axially slidable on and coaxially surrounding the tube;
   a first slide ring fixed to the control sleeve and carrying a seal ring turned toward the port of the rotatable part;
   a second slide ring on the rotatable part at the port thereof and axially engageable with the first slide ring, the tube, control sleeve, first ring, and second ring together forming an axially throughgoing passage for the fluid;

seals engaged between the stationary part, the tube, and the control sleeve and forming an annular and pressurizable chamber around the tube, separate from the passage, and in which an axially directed and annular end face of the axially slidable control sleeve is exposed, whereby pressurization of the chamber presses the slide rings axially against each other; and means for applying fluid pressure to the chamber and thereby varying the axial pressure with which the first slide ring bears axially on the second slide ring.

2. The fluid-transfer coupling defined in claim 1, further comprising:

a temperature sensor juxtaposed with the first slide ring for detecting the temperature thereof; and a controller connected to the sensor for operating the pressure-applying means in accordance with an output of the sensor.

3. The fluid-transfer coupling defined in claim 1, further comprising:

a conduit connected to the stationary part for feeding the fluid thereto, the means for applying pressure including a valve connected to the conduit for diverting the fluid therefrom to the chamber.

4. The fluid-transfer coupling defined in claim 1, further comprising:

a spring braced between the one part and the control sleeve for axially biasing the first slide ring against the second slide ring.

5. The fluid-transfer coupling defined in claim 1, further comprising:

a pressure-control and reducing valve connected to the source of the fluid;

a conduit opening into the chamber; and a reversing valve between the pressure valve and the conduit and connected to a sump for connecting the conduit either to the pressure valve and thereby pressurizing the chamber or to the sump to depressurize the chamber.

6. The fluid-transfer coupling defined in claim 1 wherein the tube and control sleeve are coaxial.

* * * * *